(No Model.)
W. HAMILTON.
WHEEL FOR BICYCLES.
No. 575,347. Patented Jan. 19, 1897.
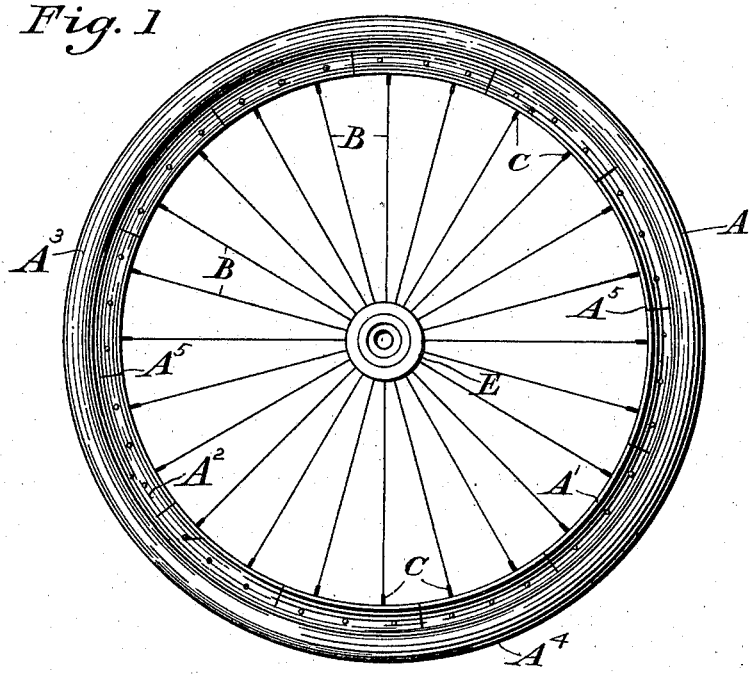
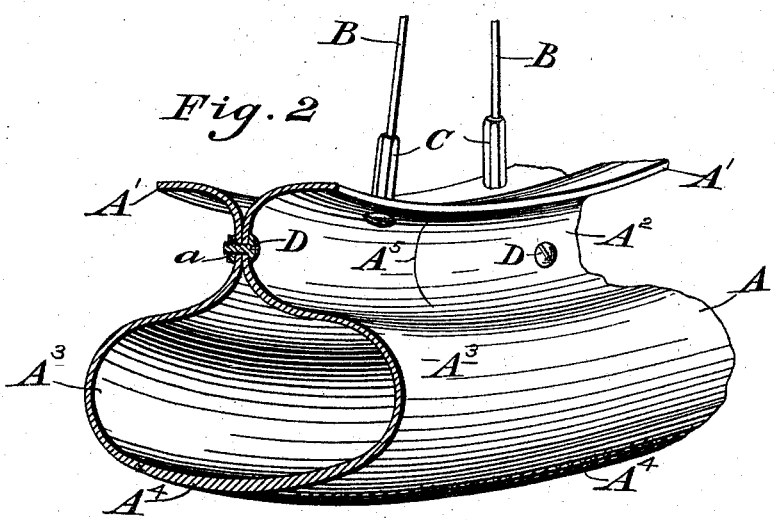
Witnesses:
T. J. Klossowski
B. Krusper
Inventor —
William Hamilton
By his Atty

United States Patent Office.

WILLIAM HAMILTON, OF SOUTH BEND, INDIANA, ASSIGNOR OF ONE-THIRD TO ANDREW J. HAMILTON, OF GLOBE, ARIZONA TERRITORY.

WHEEL FOR BICYCLES.

SPECIFICATION forming part of Letters Patent No. 575,347, dated January 19, 1897.

Application filed May 28, 1896. Serial No. 593,483. (No model.)

*To all whom it may concern:*

Be it known that I, WILLIAM HAMILTON, a citizen of the United States, residing at South Bend, in the county of St. Joseph and State of Indiana, have invented certain new and useful Improvements in a Combined Wheel Tire and Rim, of which the following is a specification.

The object of my invention is to provide a combined steel tire and rim for bicycle-wheels and similar light vehicles which will be light, strong, and highly flexible and elastic, and which will obviate the use of air-cushion tires upon wheel-rims, and which is not liable, as are the air-cushion tires, to being cut or punctured.

A further object of my invention is to make the entire rim of one piece of sheet metal and connect to it the steel-wire spokes to form a wheel in a novel manner which will secure the maximum degree of strength and durability.

To these ends my invention consists, primarily, in a tubular wheel rim and tire made of a sheet-metal plate, the sides of which are brought together and screwed and then turned outwardly to provide inner rim-flanges upon each side, to which the steel-wire spokes are connected in a simple, strong, and durable manner by nipples, the heads of which are on the outside of said rim and free of access and which, together with a metal hub of preferred construction, will comprise a wheel entire having an elastic and flexible rim which will answer the requirements of a wheel fitted with a rubber cushion-tire without possessing any of the objectionable features of such tire.

In the accompanying drawings, Figure 1 is a side elevation of my improved wheel and sheet-metal-rim tire; and Fig. 2 is a sectional perspective view of a fragment of the sheet-metal-rim tire, upon an enlarged scale.

A semitubular sheet of metal, preferably steel, is rolled with ogee-shaped sides and in circular form with lap-welded ends of suitable dimensions to form a continuous gutter-shaped wheel-rim A, having outwardly-turned rim-flanges A', a web-section A², side bows A³, and an outwardly-convex tread-section A⁴, of sufficient width to secure the required degree of strength and elasticity.

The rim-flanges A' are preferably made thicker than the sides and web to receive perforations for the attachment of spokes B by means of nipples C, passed through the said perforations of the flanges, and the web-sections A² of the wheel rim and tire are also perforated at $a$ to receive screws D, which firmly secure the said web-sections together. By use of this rim the head of nipples C is on outer surface of said rim-flange, unobstructed and free of access at any time.

The web-sections and rim-sections are preferably gored or slit at suitable intervals A⁵ to allow the outer sides of the sheet metal to be drawn together, forming reverse ogee curves and bringing the web-sections A² together with their perforations $a$ opposite each other to be securely united by the screws D and with the rim-flanges A' held close together, the spokes B being staggered or secured alternately to each of said rim-flanges.

The ogee outline of the sides, web, and rim-flanges gives great strength to the wheel-rim structure, each side giving a double-spring motion, the adjacent inner or web swells and the top side swells being the fundamental sources of a four-form-spring motion at one time.

The tread of the wheel is ribbed, corrugated, or cross-ribbed, as shown in Fig. 2 of the drawings, to firmly grasp the ground and prevent slipping, or any suitable surface may be formed or attached thereto which will best serve this purpose. The material or metal of the tread may be slightly thickened to secure greater strength at this point, as shown in Fig. 2 of the drawings.

The spokes B are secured to a hub E in any well-known or preferred manner, and a wheel thus formed will have great strength combined with the elasticity and resiliency of a rubber tire, while it is entirely free from the danger of being cut or punctured.

It is evident that wheels for all light road-vehicles may be thus formed which will be greatly superior to the wheels provided with a composite rim and tire heretofore used.

I claim as my invention and desire to secure by Letters Patent—

A combined wheel tire and rim formed of an end-welded sheet of steel drawn together and secured at its sides to form a hollow wheel-tube with its edges turned apart to provide inner spoke-flanges at each side and with its tread or outer peripheral surface roughened, ribbed, or corrugated transversely to prevent slipping, substantially as described.

In testimony that I claim the foregoing as my invention I have signed my name in the presence of two subscribing witnesses.

WILLIAM HAMILTON.

Witnesses:
B. KRUEPER,
R. LUCKE.